United States Patent
Wilson et al.

(10) Patent No.: US 11,725,622 B1
(45) Date of Patent: Aug. 15, 2023

(54) POWER PACKET NETWORKS FOR WAVE ENERGY CONVERTER ARRAYS

(71) Applicants: National Technology & Engineering Solutions of Sandia, LLC, Albuquerque, NM (US); Michigan Technological University, Houghton, MI (US)

(72) Inventors: David G. Wilson, Tijeras, NM (US); Raymond H. Byrne, Albuquerque, NM (US); Steven F. Glover, Albuquerque, NM (US); Tu Anh Nguyen, Albuquerque, NM (US); Rush D. Robinett, III, Tijeras, NM (US); Wayne W. Weaver, Hancock, MI (US); Madelyn G. Veurink, Albuquerque, NM (US)

(73) Assignees: National Technology & Engineering Solutions of Sandia, LLC, Albuquerque, NM (US); Michigan Technological University, Houghton, MI (US)

( * ) Notice: Subject to any disclaimer, the term of this patent is extended or adjusted under 35 U.S.C. 154(b) by 0 days.

(21) Appl. No.: 17/675,064

(22) Filed: Feb. 18, 2022

(51) Int. Cl.
    *F03B 13/18* (2006.01)
    *H02J 3/48* (2006.01)
    (Continued)

(52) U.S. Cl.
    CPC .......... *F03B 13/1885* (2013.01); *H02J 1/106* (2020.01); *H02J 3/381* (2013.01);
    (Continued)

(58) Field of Classification Search
    CPC ....... F03B 13/1885; H02J 1/106; H02J 3/381; H02J 3/48; H02J 7/34; H02J 2300/20
    (Continued)

(56) References Cited

U.S. PATENT DOCUMENTS

| | | | |
|---|---|---|---|
| 2012/0150679 A1* | 6/2012 | Lazaris ..................... | F03G 6/00 705/26.2 |
| 2013/0346768 A1* | 12/2013 | Forbes, Jr. .............. | G06F 1/266 713/310 |

(Continued)

OTHER PUBLICATIONS

Wilson, D. G. et al., "WEC Arrays with Power Packet Networks for Efficient Energy Storage and Grid Integration," OCEANS 2021 MTS/IEEE, San Diego, CA, Sep. 20-23, 2021 8 pages.

(Continued)

*Primary Examiner* — Hoang M Nguyen
(74) *Attorney, Agent, or Firm* — Kevin W. Bieg

(57) ABSTRACT

One of the biggest challenges for all renewable energy sources (RES) is that they are variable power generators which will require reactive power or energy storage systems (ESS) to provide reliable power quality (ideally power factor of one) at the power grid generation side. The present invention is directed to a power packet network (PPN) for integrating wave energy converter (WEC) arrays into microgrids. Specifically, an array of WECs can be physically positioned such that the incoming regular waves will produce an output emulating an N-phase AC system such that the PPN output power is constant. ESS requirements are thereby minimized whilst maintaining grid stability with high power quality. This will enable RES integration onto a future smart grid for large-scale adoption and cost reduction while preserving high efficiency, reliability, and resiliency.

3 Claims, 15 Drawing Sheets

(51) Int. Cl.
*H02J 3/38* (2006.01)
*H02J 7/34* (2006.01)
*H02J 1/10* (2006.01)

(52) U.S. Cl.
CPC .................. *H02J 3/48* (2013.01); *H02J 7/34* (2013.01); *H02J 2300/20* (2020.01)

(58) Field of Classification Search
USPC ................ 60/497–499, 504–505; 290/42, 53
See application file for complete search history.

(56) References Cited

U.S. PATENT DOCUMENTS

| | | | | |
|---|---|---|---|---|
| 2016/0049791 | A1* | 2/2016 | Johnston | H02J 3/381 361/104 |
| 2018/0097452 | A1* | 4/2018 | Chapman | H02J 3/381 |
| 2018/0166892 | A1* | 6/2018 | Sepe, Jr. | H02J 7/345 |
| 2021/0119452 | A1* | 4/2021 | Weaver | H02J 7/34 |

OTHER PUBLICATIONS

Chen, M. and Poor, H. V., High-Frequency Power Electronics at the Grid Edge: a bottom-up approach toward the smart grid, IEEE Electrification Magazine, 2020, vol. 8, pp. 6-17.

Saitoh, H. et al. "An Autonomous Decentralized Control Mechanism for Power Flow in an Open Electric Energy Network," Electrical Engineering in Japan, 1997, vol. 121, pp. 10-18.

Abe, R. et al., "Digital Grid: Communicative Electrical Grids of the Future," IEEE Transactions on Smart Grid, 2011, vol. 2, pp. 399-410.

Takahashi, R. et al., "Router for Power Packet Distribution Network: Design and Experimental Verification," IEEE Transactions on Smart Grid, 2015, vol. 6, pp. 618-626.

Takahashi, R. et al., "Power Regulation With Predictive Dynamic Quantizer in Power Packet Dispatching System," IEEE Transactions on Industrial Electronics, 2016, vol. 63, pp. 7653-7661.

Wiegel, F. et al., "A Novel Receiver Design for Energy Packet-Based Dispatching," Energy Technology, 2021, vol. 9, 2000937, 17 pages.

Weaver, W. W. et al., "Distributed Control and Energy Storage Requirements of Networked Dc Microgrids," Control Engineering Practice, 2015, vol. 44, pp. 10-19.

Weaver, W. W. et al., "WEC Array Networked Microgrid Control Design and Energy Storage System Requirements," OCEANS 2019 MTS/IEEE Seattle, 2019, pp. 1-6, doi: 10.23919/OCEANS40490. 2019.8962576.

* cited by examiner

POWER PACKET NETWORKS FOR WAVE ENERGY CONVERTER ARRAYS

STATEMENT OF GOVERNMENT INTEREST

This invention was made with Government support under Contract No. DE-NA0003525 awarded by the United States Department of Energy/National Nuclear Security Administration. The Government has certain rights in the invention.

STATEMENT REGARDING PRIOR DISCLOSURES BY THE INVENTOR OR A JOINT INVENTOR

The following disclosure is submitted under 35 U.S.C. 102(b)(1)(A): David G. Wilson, Rush D. Robinett III, Wayne W. Weaver, Madelyn G. Veurink, and Steve F. Glover, "WEC Arrays with Power Packet Networks for Efficient Energy Storage and Grid Integration," OCEANS 2021 MTS/IEEE, San Diego, Calif., Sep. 20-23, 2021. The subject matter of this disclosure was conceived of or invented by the inventors named in this application.

FIELD OF THE INVENTION

The present invention relates to wave energy conversion and, in particular, to power packet networks for wave energy converter arrays.

BACKGROUND OF THE INVENTION

Enabling ubiquitous use of wave energy converter (WEC) arrays along all coastlines is dependent upon maximizing energy capture while minimizing installation and operational costs. Marine energy technology (MET) for renewable energy generation from offshore wind and water power sources requires conversion into electricity and other forms of usable energy. See Water Power Technologies Office, Powering the Blue Economy Report, Office of EERE, Mar. 28, 2019. These METs will need new advances in power electronic and control system designs and architectures for both islanded and onshore electric power grid integration. Typically, these renewable energy sources (RES) are either variable or stochastic in nature. Currently, this requires energy storage systems (ESS) and additional components to provide constant power output with satisfactory power quality but with increased complexity.

Power electronic systems are becoming a key integral part of interfacing active grid technologies, such as renewable energies, transportation electrification, and data communications. Conventional power converter designs are commonly utilized for voltage conversion. Grid stability and resiliency are still new features to be exploited by power converters. New methodologies are needed to connect distributed RES to loads to enable the future smart grid. Power electronic systems are being pushed to higher levels of more sophisticated energy management functions. See M. Chen and V. H. Poor, *IEEE Electrific. Mag.* 8(3), 6 (2020).

The smart grid of the future will benefit from shifting from conventional constant voltage and frequency synchronous operations to asynchronous power/energy packet network routing architectures and methodologies. With the expansion of distributed RES and new METs, packetized power enabled microgrids are emerging as effective solutions. To optimize the full benefits of a microgrid solution, energy must be able to be freely traded and exchanged between sources and loads with economic incentives. See M. Chen and V. H. Poor, *IEEE Electrific. Mag.* 8(3), 6 (2020).

Early work on packet-based energy dispatching (or power packets) was investigated by Saitoh. See H. Saitoh et al., *Electr. Eng. Jpn.* 121(4), 1997. The idea of electric power dispatching as a packet of energy tagged with the dispatching information was explored. In Abe the idea of a digital grid is introduced where large synchronous grids are divided into smaller segmented grids which are connected asynchronously, via multileg IP addressed AC/DC/AC converters called digital grid routers. These routers communicate with each other through existing transmission lines re-purposed as digital grid transmission lines. The digital grid can support high penetration of intermittent solar and wind power generation with ESS, prevent cascading outages (addressing grid stability), and trade electricity as a commodity. See R. Abe et al., *IEEE Trans. Smart Grid* 2(2), 399 (2011).

In Takahashi, power packet routers are designed and experimentally verified for realization of a networked power packet distribution network (PPDN). The results verified the feasibility of PPDN. See R. Takahashi et al., *IEEE Trans. Smart Grid* 6(2), 618 (2015). A power regulation algorithm was designed to address the load requirement of a dispatching PPN. See R. Takahashi et al., *IEEE Trans. Ind. Electron.* 63(12), 7653 (2016). The stability of the system with predictive dynamic quantizer in a dispatching PPN was verified analytically as a switched system. It was verified, from both numerical and experimental results, that simultaneous voltage demands from multiple loads in the dispatching PPN were satisfied with the regulation method. See R. Takahashi et al., *IEEE Trans. Ind. Electron.* 63(12), 7653 (2016). The revelation of new functionality in PPNs and PPDNs will become more attractive for large-scale adoption and cost reduction while preserving reliability and resiliency for the future smart grid. Wiegel discusses the performance and applicability of a novel receiver for packet-based energy dispatching. See F. Wiegel et al., *Energy Technol.* 9, 2000937 (2021).

For METs such as WECs, wave inputs are oscillations that require ESS at both the buoy and grid interfaces. When a water wave impacts the WEC device at the resonance frequency, the WEC can absorb a significant amount of energy from the wave very efficiently. However, when the WEC is off-resonance with the impacting waves the WEC operates much less efficiently. This requires additional complexity; filtering, individual frequency tuning, associated power electronics, and ESS to meet the reactive power requirements. See W. W. Weaver et al., "WEC Array Networked Microgrid Control Design and Energy Storage System Requirements," OCEANS' 19 MTS/IEEE, Seattle Wash., Oct. 26-31, 2019. Wilson et al. designed a nonlinear control to simply optimize resistive feedback to robustly maximize the power/energy capture while reactive power was realized through a mechanical/hydrostatic nonlinear buoy geometric modification. See D. G. Wilson et al., *J. Mar. Sci. Eng.* 8, 84 (2020); and D. G. Wilson et al., "Nonlinear WEC Optimized Geometric Buoy Design for Efficient Reactive Power Requirements," OCEANS' 19 MTS/IEEE, Seattle Wash., Oct. 26-31, 2019.

SUMMARY OF THE INVENTION

The present invention is directed a power packet network for wave energy converter arrays, comprising an array of two or more wave energy converters, wherein each wave energy converter converts incoming water wave motion to electrical power that is injected into a collection bus; and an energy storage system that injects or absorbs electrical power into or from the collection bus; wherein each of the wave energy converters is physically spaced with respect to each other and the incoming water wave such that the electrical power injected into the collection bus from each of the wave energy converters is phased with respect to each other so that the energy stored by the energy storage system required to maintain a constant bus voltage is minimized. Each of the wave energy converters can comprise a buoy that converts the incoming water wave motion to a mechanical motion and a power take-off that converts the mechanical motion to an electrical power. For example, the array can comprise three wave energy converters that are physically spaced with respected to each other and the incoming water wave such that the electrical power injected into the collection bus from each of the wave energy converters is phased by 60° with respect to each other.

BRIEF DESCRIPTION OF THE DRAWINGS

The detailed description will refer to the following drawings, wherein like elements are referred to by like numbers.

DETAILED DESCRIPTION OF THE INVENTION

The present invention is directed to a power packet network (PPN) to efficiently integrate several WECs in an array. This minimizes ESS requirements while leveraging the WEC physical location with respect to the incoming wave front to allow for increased power capture and power quality through phasing the inputs on a collection bus. As described below, a simple AC RLC circuit operating at a power factor of one is shown to be a PPN. An AC to AC converter-based network is also shown to be a PPN. Similarly, N-sources can be phased to be analogous to incoming waves that are physically located for a N-WEC system. This produces an output emulating an N-phase AC system such that the PPN output power appears to be constant. The benefits of utilizing PPN phasing is demonstrated with a grid-to-substation-to-WEC array configuration.

Simple PPN RLC Circuit

Figure 1:
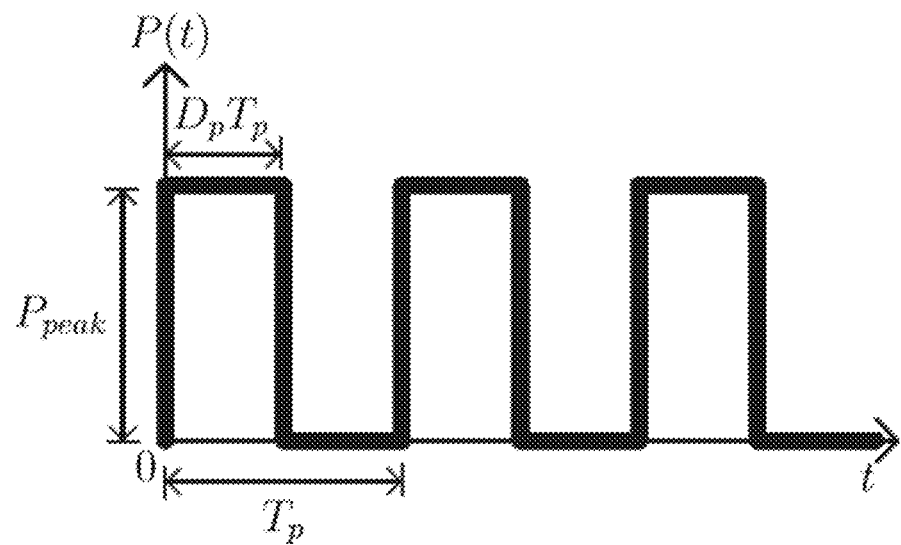
FIG. 1 illustrates a pulse width modulated signal modeled with a time dependent power waveform.
Figure 2:
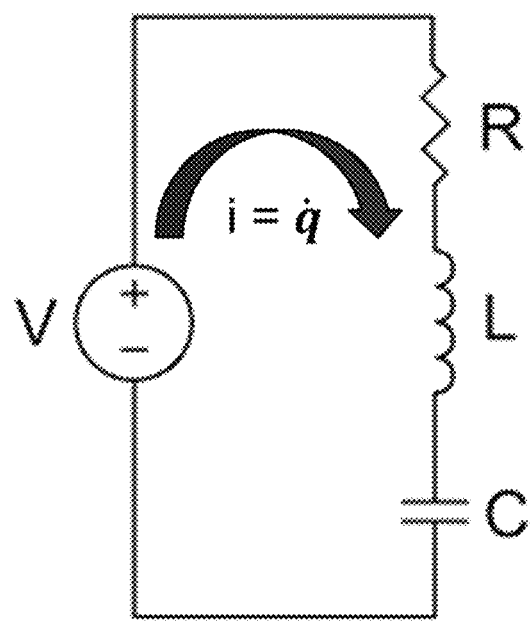
FIG. 2 illustrates a single AC RLC series circuit.

The definition of a PPN is a network that produces a power signal that is modeled as a pulse train or Pulse Width Modulated (PWM) signal, as shown in FIG. 1, to a load. A simple AC RLC series circuit, as shown in FIG. 2, operating at a power factor of 1 is a PPN.

Hamiltonian Surface Shaping and Power Flow Control (HSSPFC) can be used to develop an electrical model for the PPN. See R. D. Robinett III and D. G. Wilson, *Nonlinear Power Flow Control Design: Utilizing Exergy, Entropy, Static and Dynamic Stability, and Lyapunov Analysis*; Springer-Verlag: London Ltd. (2011); and R. D. Robinett III and D. G. Wilson, *Int. J. Control* 81(12), 1886 (2008).

The PWM signal can be parameterized as a Fourier series given as $$P(t) = P_{peak}\left(D_p + \frac{2}{\pi}\sum_{n=1}^{\infty}\frac{\sin(n\pi D_p)}{n}\cos\left(n\frac{2\pi}{T_p}t\right)\right) \quad (1)$$

where $D_p$=duty cycle (0-100%), $T_p$=pulse period, and $P_{peak}$=peak pulse power.

The energy storage terms of the Hamiltonian for electrical systems are typically associated with the capacitance and inductance of the electrical network such as $$\mathcal{H}_e = \frac{1}{2C}q^2 + \frac{1}{2}L\dot{q}^2 \quad (2)$$

where C is the capacitance, q is the charge, L is the inductance, and $\dot{q}$ is the charge rate or current. The governing circuit equation for an RLC electrical network is $$L\ddot{q} + \frac{1}{C}q = -R\dot{q} + V_0\cos\Omega t. \quad (3)$$

The time derivative of the Hamiltonian is $$\dot{\mathcal{H}}_e = \left[L\ddot{q} + \frac{1}{C}q\right]\dot{q} = [-R\dot{q} + V_0\cos\Omega t]\dot{q}. \quad (4)$$

Impedance matching occurs for electrical systems when the Hamiltonian is constant or $$\dot{\mathcal{H}}_e = 0 \quad (5)$$

See R. D. Robinett III and D. G. Wilson, *Nonlinear Power Flow Control Design: Utilizing Exergy, Entropy, Static and Dynamic Stability, and Lyapunov Analysis*; Springer-Verlag:

London Ltd. (2011). This implies the forcing frequency of the sinusoidal voltage, Ω, is equal to the natural frequency of the circuit, $\bar{\omega}$, or $$\bar{\omega}^2 = \frac{1}{LC} = \Omega^2. \quad (6)$$

In this condition, the power factor (PF) is equal to one, which produces $$R\bar{q} = V_0 \cos \Omega t. \quad (7)$$

See R. J. Smith and R. C. Dorf, *Circuits, Devices, and Systems: A First Course in Electrical Engineering* (5th ed.); New York: John Wiley & Sons (1992). The resulting output power to the load is $$R\dot{q}^2 = \frac{V_0^2}{R}\cos^2\Omega t = \frac{V_0^2}{2R}[1+\cos 2\Omega t]. \quad (8)$$

Figure 3:
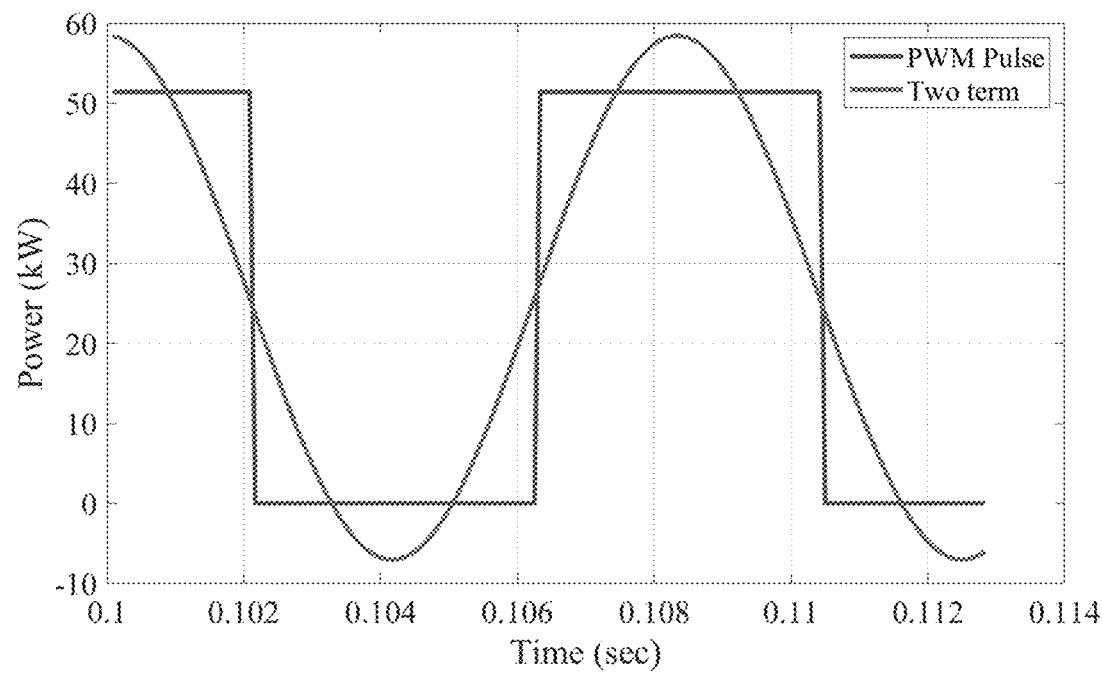
FIG. 3 is a graph of power for a two-term approximation for PWM signal with R=7.0 Ohms, L=70.3619 mH, and C=100.0 µF circuit values.
Figure 4:
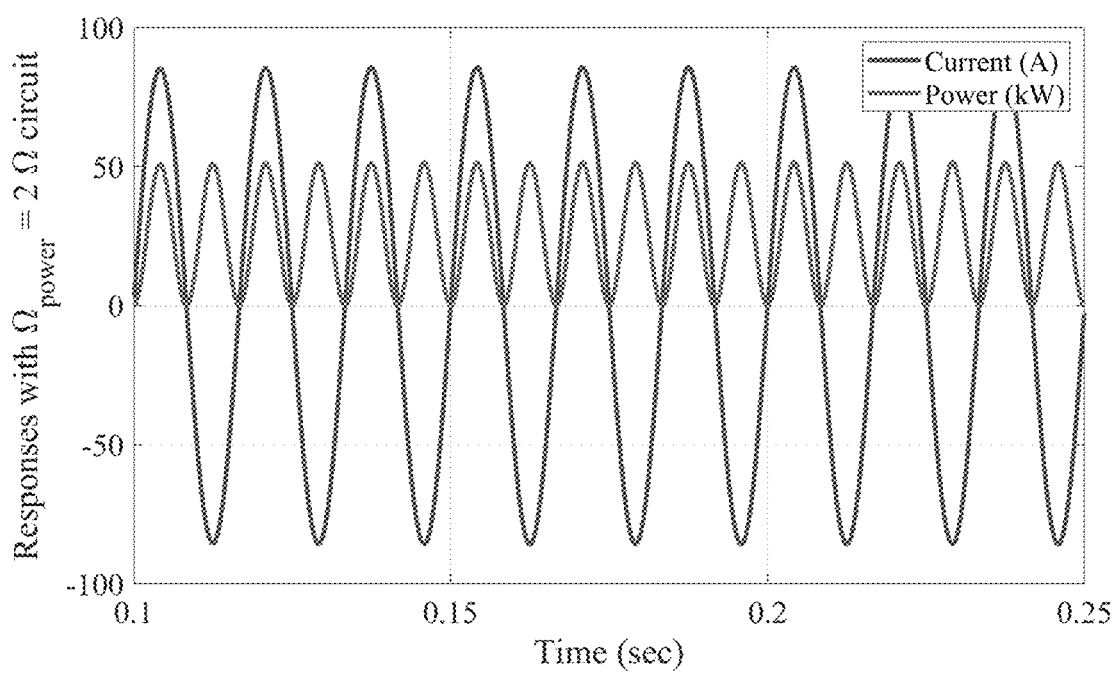
FIG. 4 is a graph of power and current for a PPN RLC circuit operating at 60 Hz with PF=1 with $P_{peak}$=51.43 kW, $V_0$=600.0 volt, R=7.0 Ohms, L=70.3619 mH, and C=100.0 µF circuit values.

Recognize that the last two terms of Eq. (8) are the first two terms of a Fourier series of a PWM signal with a 50% duty cycle. For a square pulse example, in Eq. (1) and with n=1 this two-term approximation is shown in FIG. 3. This means that an RLC circuit driven with a single frequency AC voltage operating at a power factor of 1 is a PPN. Note that the power is twice the frequency of the current or $\Omega_{power}=2\Omega$ in Eq. (8). An example power plot is shown in FIG. 4.

AC to AC Converter-Based PPN

The next example is an AC converter network with a conventional (magnetic) transformer with turns ratio λ:1, (or an AC to AC switching converter with conversion ratio λ) is analyzed and shown to be a PPN. The circuit equations are defined as $$L\frac{di}{dt} = V_s - \lambda v_c - R_L i \quad (9)$$

and $$C\dot{v}_c = -\frac{1}{R_c}v_c + \lambda i. \quad (10)$$

Equations (9) and (10) are combined into a single second order differential equation with a constant duty cycle and with $R_L \approx 0$ gives $$C\ddot{v}_c = -\frac{1}{R_c}\dot{v}_c + \lambda\frac{di}{dt} = -\frac{1}{R_c}\dot{v}_c + \frac{\lambda}{L}[V_s - \lambda v_c]. \quad (11)$$

Equation (11) can be written in the same form as Eq. (3), $$C\ddot{v}_c + \frac{\lambda^2}{L}v_c = -\frac{1}{R_c}\dot{v}_c + \frac{\lambda}{L}V_s. \quad (12)$$

The Hamiltonian for the converter is $$\mathcal{H}_e = \frac{1}{2}C\dot{v}_c^2 + \frac{1}{2}\frac{\lambda^2}{L}v_c^2. \quad (13)$$

The time derivative of the Hamiltonian is $$\dot{\mathcal{H}}_e = \left[C\ddot{v}_c + \frac{\lambda^2}{L}v_c\right]\dot{v}_c = \left[-\frac{1}{R_c}\dot{v}_c + \frac{\lambda}{L}V_s\right]\dot{v}_c. \quad (14)$$

Impedance matching is when the Hamiltonian is constant or $$\dot{\mathcal{H}}_e = 0 \quad (15)$$

See R. D. Robinett III and D. G. Wilson, *Nonlinear Power Flow Control Design: Utilizing Exergy, Entropy, Static and Dynamic Stability, and Lyapunov Analysis*; Springer-Verlag: London Ltd. (2011). This implies the forcing frequency of the sinusoidal voltage, Ω is equal to the natural frequency of the circuit, $\bar{\omega}$ or $$\bar{\omega}^2 = \frac{\lambda^2}{LC} = \Omega^2. \quad (16)$$

The PF=1 produces $$\dot{v}_c = \frac{R_c\lambda}{L}V_s = \frac{R_c\lambda}{L}V_0\cos\Omega t. \quad (17)$$

See R. J. Smith and R. C. Dorf, *Circuits, Devices, and Systems: A First Course in Electrical Engineering* (5th ed.); New York: John Wiley & Sons (1992). Then the output power to the load is $$\begin{aligned}\frac{1}{R_c}\dot{v}_c^2 &= \frac{\lambda}{L}V_s\dot{v}_c = \frac{R_c\lambda^2}{L^2}(V_0\cos\Omega t)^2 \\ &= \frac{R_c\lambda^2 V_0^2}{2L^2}[1+\cos 2\Omega t].\end{aligned} \quad (18)$$

Recognize that the last two terms of Eq. (18) are the first two terms of a Fourier series of a PWM signal with a 50% duty cycle. Also, for a square pulse example, in Eq. (1) with n=1 this approximation is shown in FIG. 3. This demonstrates that an AC to AC converter-based network driven with a single frequency produces an AC voltage that is operating at PF=1 and is by definition a PPN.

Figure 5:
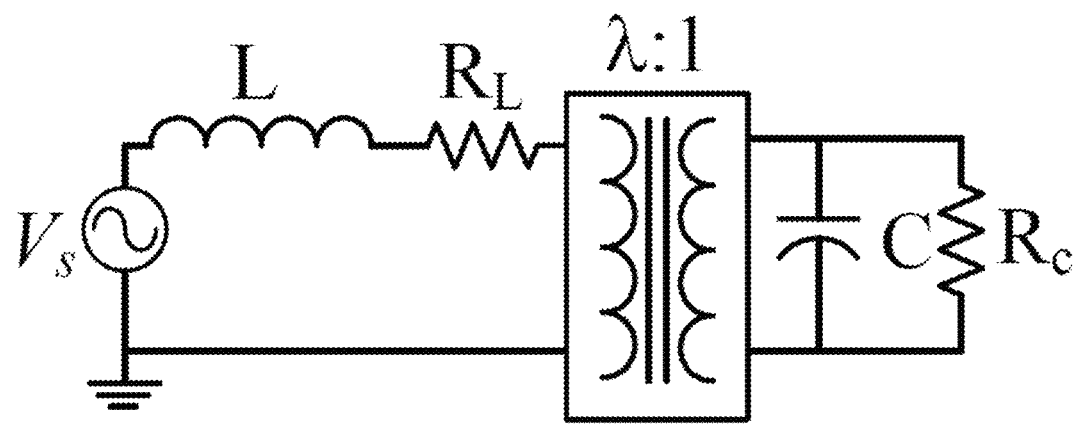
FIG. 5 illustrates an AC to AC converter-based circuit. Parameters are given as: $R_c$=0.8 Ohms, $R_L \approx 0$, L=1.5 mH, C=81.667 F, and λ=0.22 circuit values.
Figure 6:
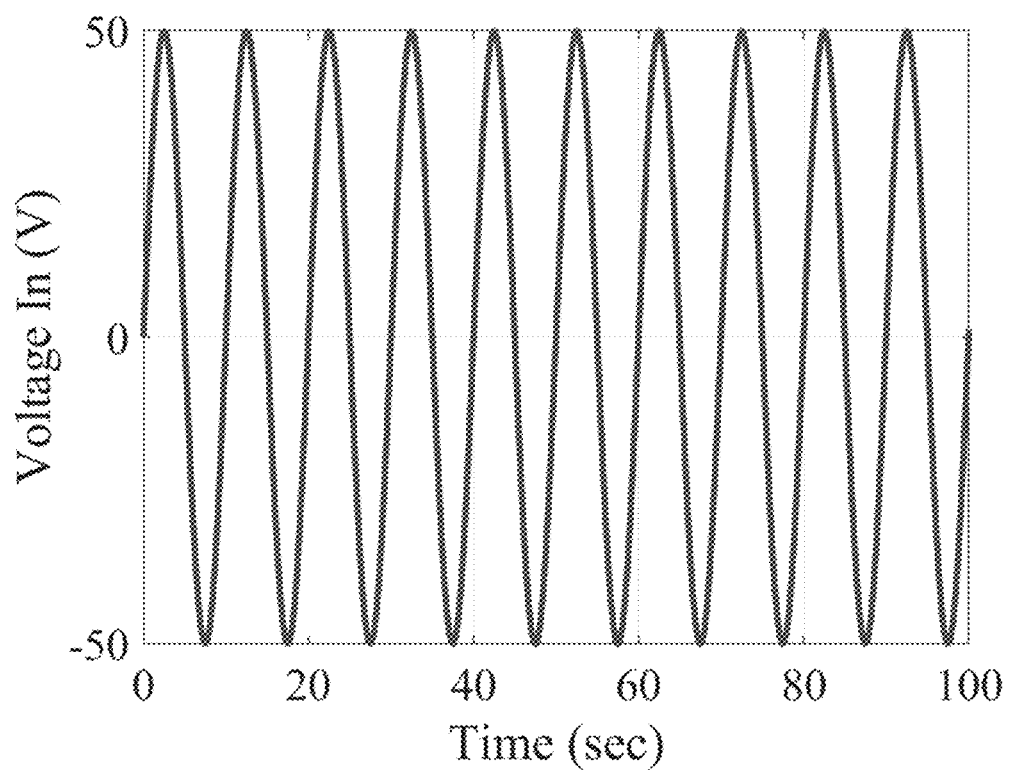
FIG. 6 is a graph of the AC to AC converter voltage input signal.
Figure 7:
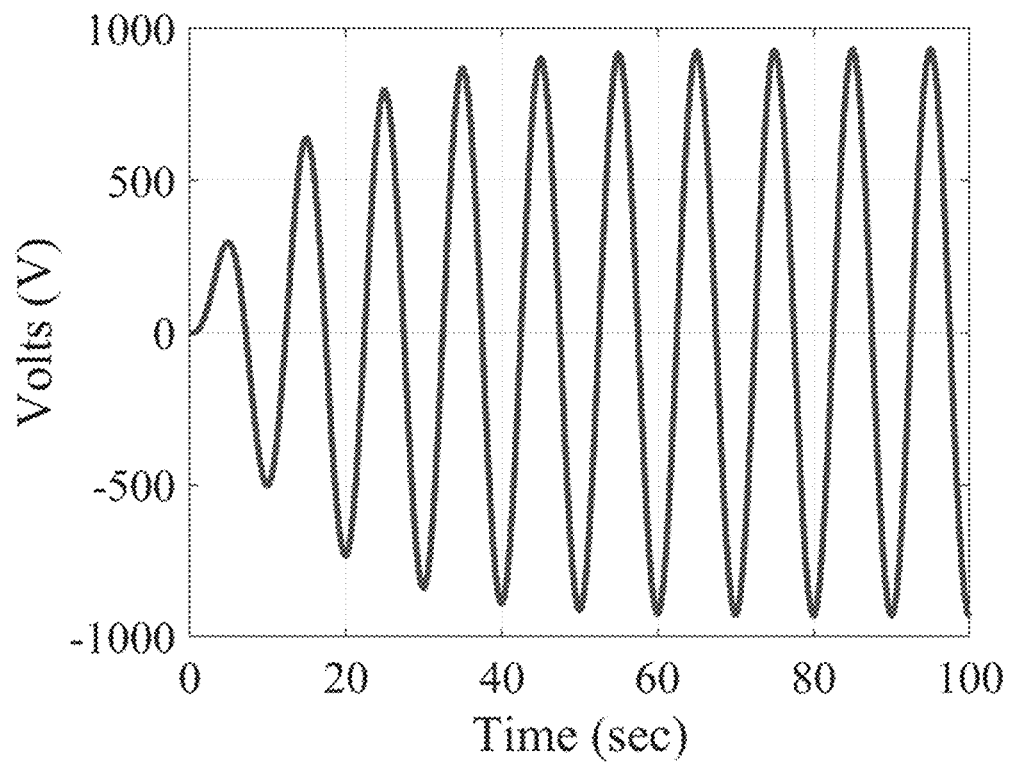
FIG. 7 is a graph of the bus voltage response.
Figure 8:
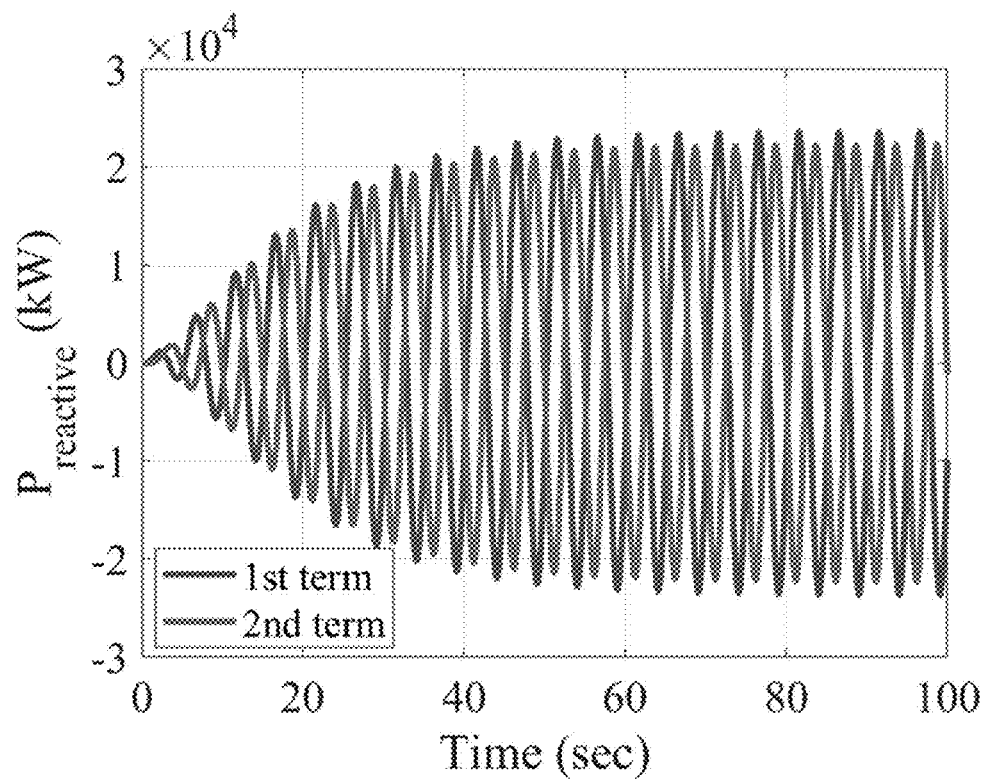
FIG. 8 is a graph of reactive power responses.
Figure 9:
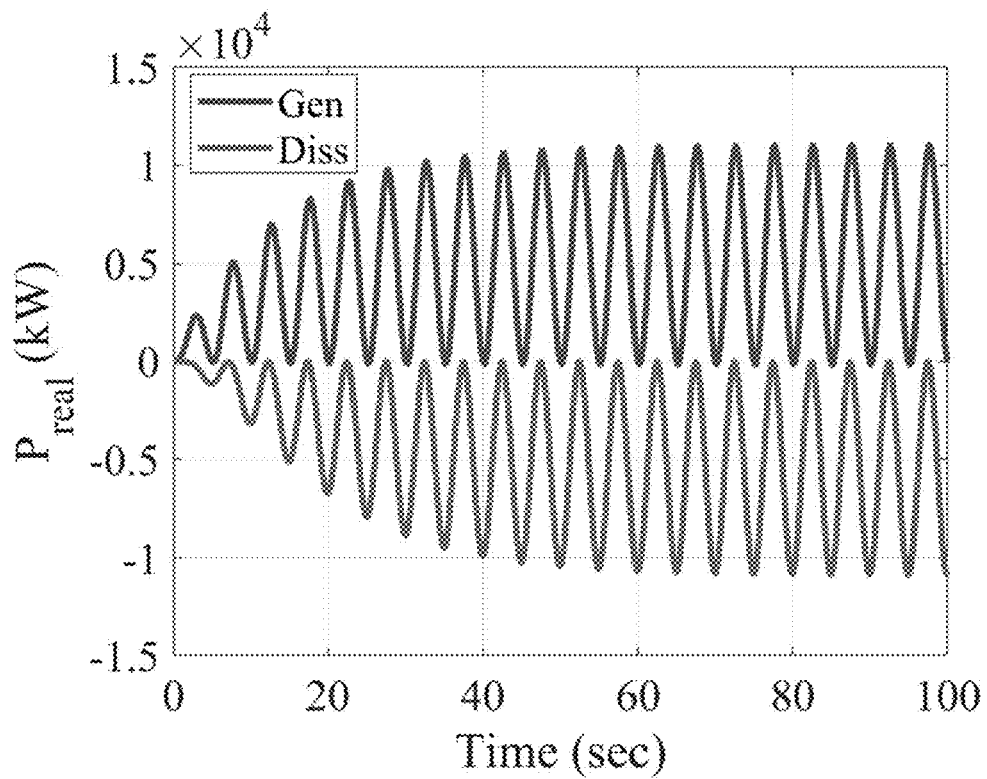
FIG. 9 is a graph of real power responses.
Figure 10:
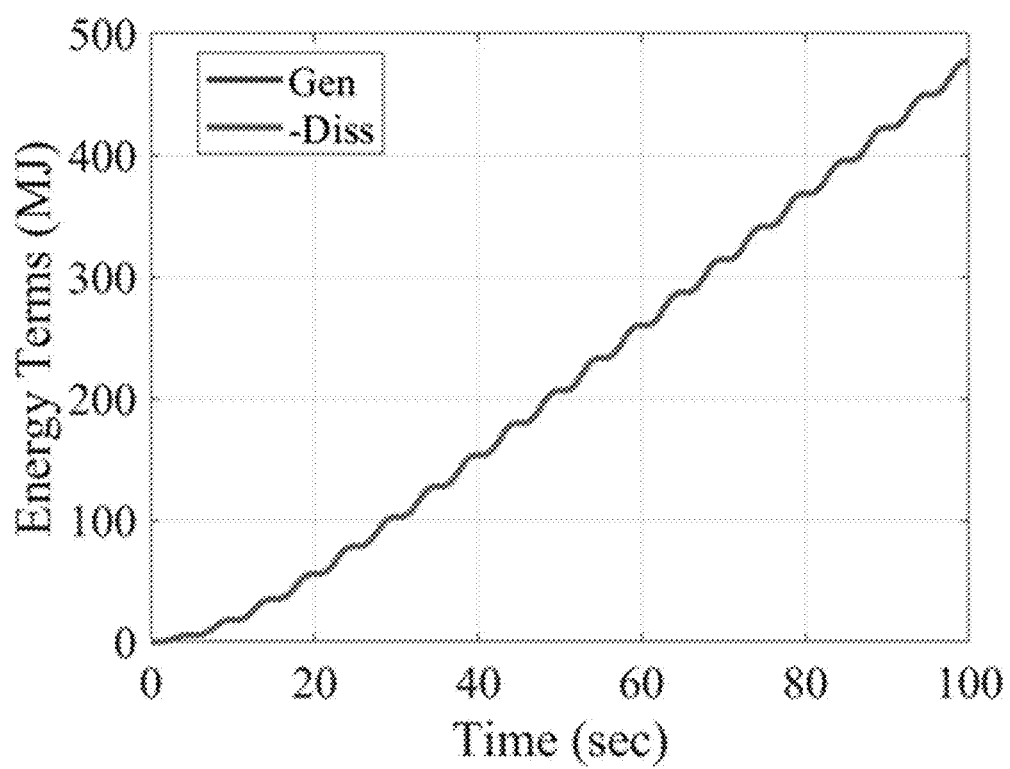
FIG. 10 is a graph of energy balance responses (generation matches dissipation).

The AC to AC converter is numerically simulated to demonstrate the circuit operating as a PPN with a PF=1. The model or circuit, as shown in FIG. 5, is driven with a voltage signal $V_S=50\sin(2\pi/10)t$ volts as shown in FIG. 6. The bus voltage $v_c$ oscillates like an AC signal, as shown in FIG. 7. Over each cycle the reactive power terms cancel, as shown in FIG. 8. The real power is balanced between generation and dissipation, see Eq. (18), and as shown in FIG. 9 with the corresponding energy transfer given in FIG. 10. The power packet is a byproduct of the intentional by design resonating AC to AC converter circuit of the system.

N-Source PPN with Regular Voltage Input

This example utilizes a PPN to asynchronously connect an N-source array to an AC microgrid while minimizing additional energy storage (for a baseline microgrid design, see W. W. Weaver et al., *Control Eng. Pract.* 44, 10 (2015)). The N-sources are phased to be analogous to incoming waves that are physically located for a N-WEC system. This will produce an output emulating an N-phase AC system such that the PPN output power appears to be constant.

Figure 11:
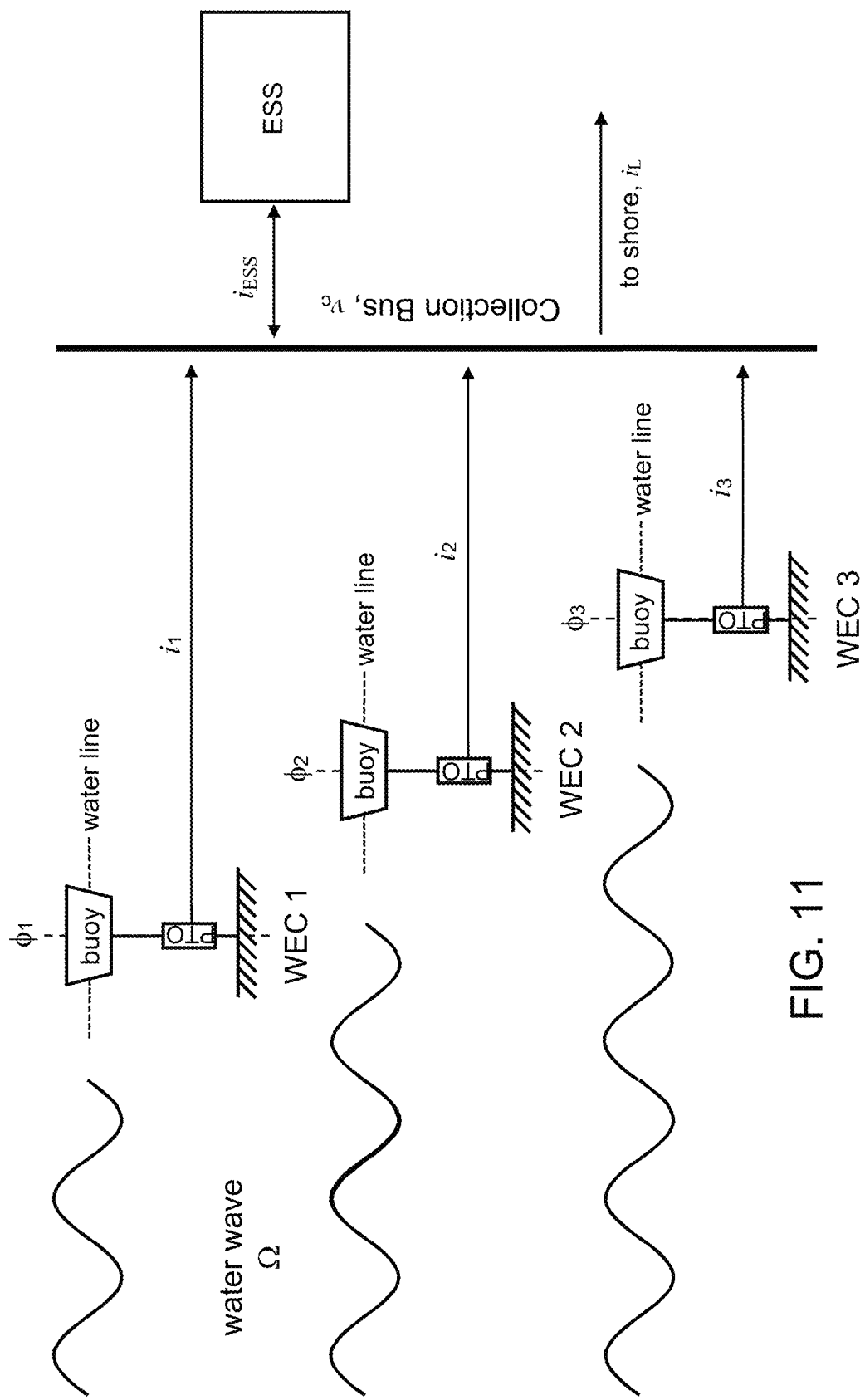
FIG. 11 is a schematic illustration of a 3-buoy WEC array.

A schematic illustration of an exemplary 3-buoy WEC array that can form a PPN is shown in FIG. 11. An incoming water wave has a frequency Q. Each WEC can comprise a buoy and a power take-off (PTO). The buoy converts the wave motion into a mechanical motion and the PTO converts the mechanical motion to electrical power that is injected into a common collection bus. The PPN can further an energy storage system (ESS) that injects or absorbs electrical power into or from the collection bus. The WECs can be physically spaced with respect to each other and the incoming water wave such that the electrical power injected into the collection bus from each of the WECs are phased ($\phi_1$, $\phi_2$, $\phi_3$) with respect to each other so that the stored energy of the EES required to maintain a constant bus voltage is minimized.

Figure 12:
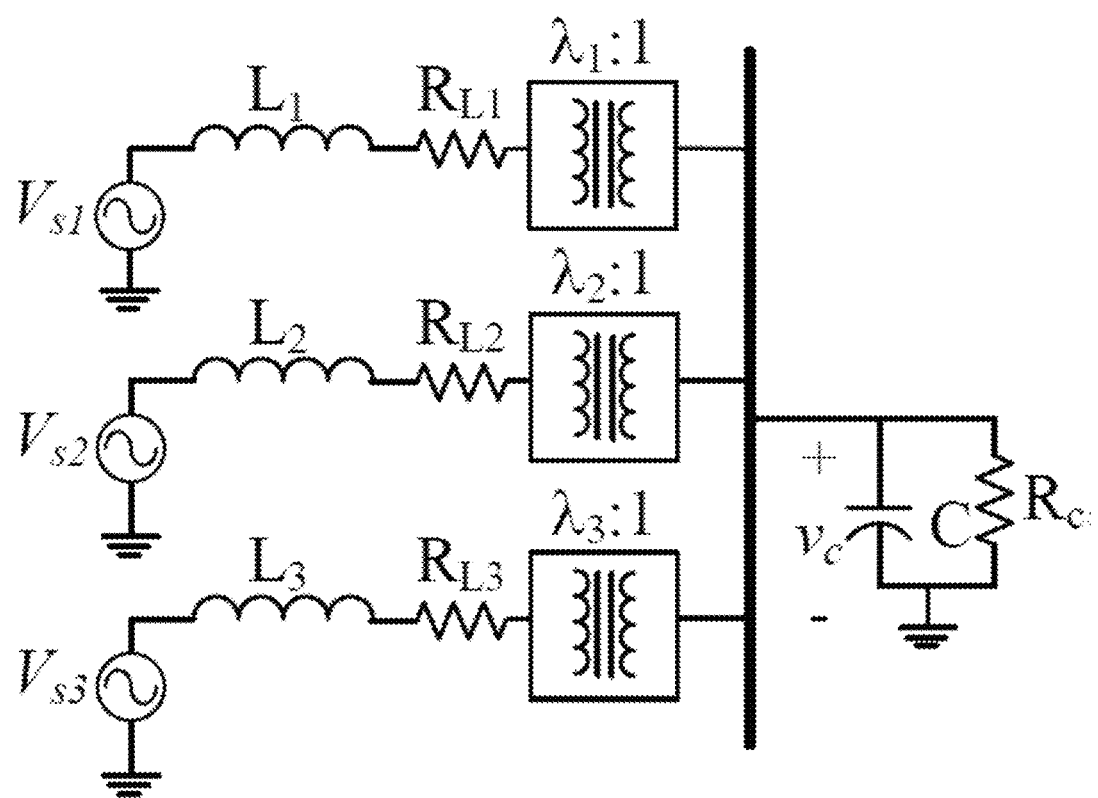
FIG. 12 is an illustration of an 3-source PPN with regular voltage input.

A schematic illustration of a representative conceptual source array configuration is shown in FIG. 12. In order to demonstrate the concept, a 3-source PPN with regular input voltages is presented. The model for the 3 AC source system with transformer ratios of $\lambda$ connected to an AC bus is given as $$L_1 \frac{di_1}{dt} = V_{s1} - \lambda_1 v_c \tag{19}$$

$$L_2 \frac{di_2}{dt} = V_{s2} - \lambda_2 v_c \tag{20}$$

$$L_3 \frac{di_3}{dt} = V_{s3} - \lambda_3 v_c \tag{21}$$

$$C\dot{v}_c = -\frac{1}{R_c} v_c + \lambda_1 i_1 + \lambda_2 i_2 + \lambda_3 i_3 \tag{22}$$

where $V_{s1}$, $V_{s2}$, $V_{s3}$ can represent voltages from the mechanical WEC PTO system. This can be written in matrix form $$M\bar{x} = Rx + D^T V \tag{23}$$

where $$R = \begin{bmatrix} 0 & 0 & 0 & -\lambda_1 \\ 0 & 0 & 0 & -\lambda_2 \\ 0 & 0 & 0 & -\lambda_3 \\ \lambda_1 & \lambda_2 & \lambda_3 & -\frac{1}{R_c} \end{bmatrix}, \text{ and}$$

$$D^T = \begin{bmatrix} 1 & 0 & 0 \\ 0 & 1 & 0 \\ 0 & 0 & 1 \\ 0 & 0 & 0 \end{bmatrix}.$$

The 3 source inputs are $$V = \begin{bmatrix} V_1 \cos(\Omega t + \phi_1) \\ V_1 \cos(\Omega t + \phi_2) \\ V_1 \cos(\Omega t + \phi_3) \end{bmatrix}.$$

The 3-source network will be a PPN if the eigenvalues of the system match the driving frequency $\Omega$. The eigenvalues of the matrix system of equations are $$\det(R - \beta M) = 0 \tag{24}$$

with $$\beta_{1,2} = 0 \text{ and } \beta^2 + \frac{1}{CR_c}\beta + \frac{1}{C}\left[\frac{\lambda_1^2}{L_1} + \frac{\lambda_2^2}{L_2} + \frac{\lambda_3^2}{L_3}\right] \tag{25}$$

which means $$\Omega^2 = \bar{\omega}^2 = \frac{1}{C}\left[\frac{\lambda_1^2}{L_1} + \frac{\lambda_2^2}{L_2} + \frac{\lambda_3^2}{L_3}\right]. \tag{26}$$

Note, the state Eqs. (19) thru (22) can be written as one second order differential equation by assuming $$C\ddot{v}_c = -\frac{1}{R_c}\dot{v}_c + \lambda\left[\frac{di_1}{dt} + \frac{di_2}{dt} + \frac{di_3}{dt}\right] \tag{27}$$

$$= -\frac{1}{R_c}\dot{v}_c + \frac{\lambda}{L}[V_{s1} + V_{s2} + V_{s3} - 3\lambda v_c] \tag{28}$$

then $$C\ddot{v}_c + \frac{3\lambda^2}{L}v_c = -\frac{1}{R_c}\dot{v}_c + \frac{\lambda}{L}[V_{s1} + V_{s2} + V_{s3}] \tag{29}$$

which produces $$\dot{v}_c = \frac{R_c \lambda}{L}[V_{s1} + V_{s2} + V_{s3}]. \tag{30}$$

When the system is impedance matched and with equally phased inputs the sources become tuned resonating devices with PF=1.

Figure 13:
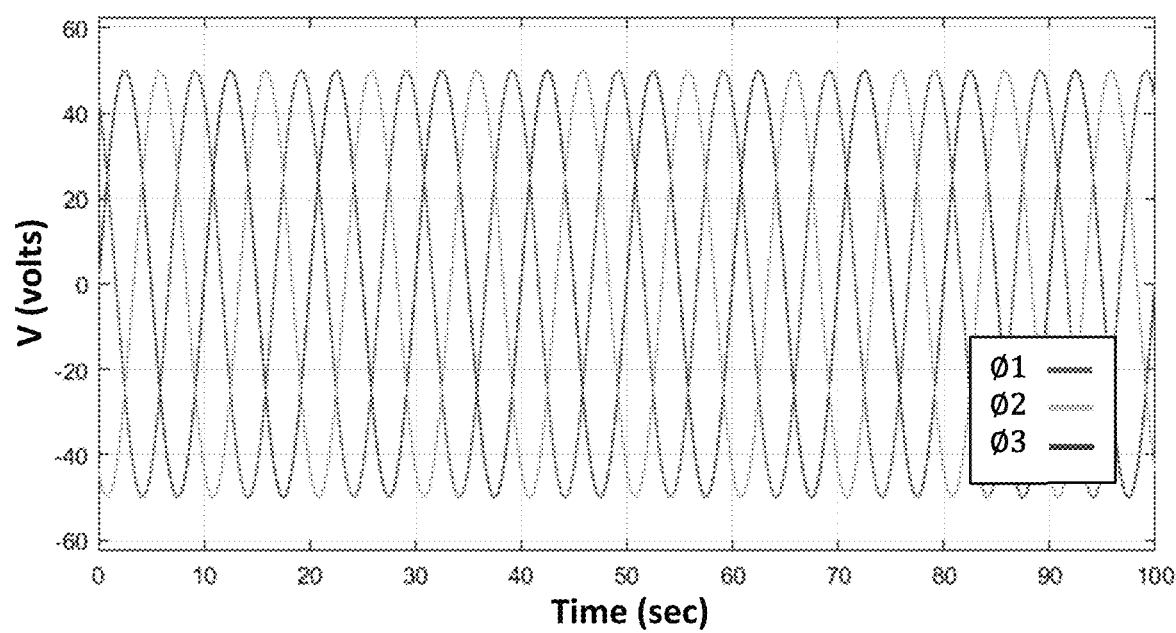
FIG. 13 is a graph of phased sinusoidal inputs for each of the WEC devices in the 3-buoy WEC array.

An equally phased sinusoidal input with $V_1$=50 volts and $\Omega$=(27/10 sec) r/s was introduced, as shown in FIG. 13. This produces three-phased power with an average real power out with balanced reactive power. This concept is applied in the next example.

3-WEC PPN Array-Substation-Shore Example

Figure 14:
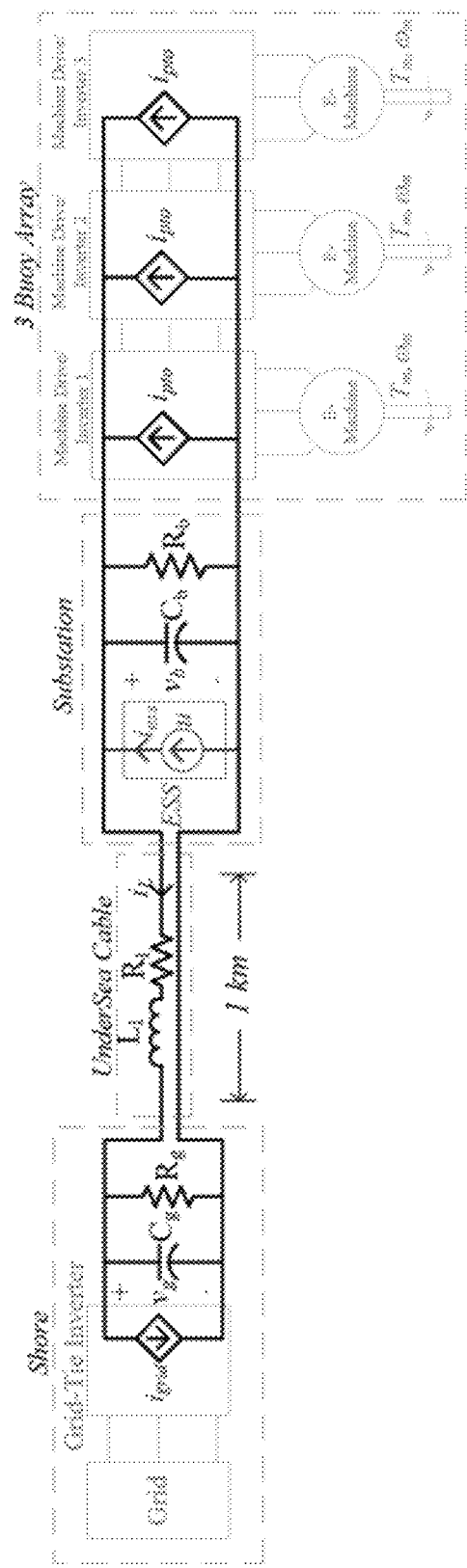
FIG. 14 is a circuit model of WEC system from shore-to-substation-to-buoy arrays.

The circuit shown in FIG. 14 is used to analyze the ESS requirements and component sizing/selection. The mechanical model of each WEC buoy is modeled as an ideal mass-spring damper with equation-of-motion given as $$M\ddot{x} + C\dot{x} + Kx = F_e + F_w(\Omega) \tag{31}$$

A PD controller for the actuator force, $F_e$, can be used to extract the most power from the wave input force, $F_\omega(\Omega)$, such that a reference force from the actuator is $$F_{e,ref} = -K_p x - k_d \dot{x} \tag{32}$$

To match the impedance of the system and extract the maximum power from the wave set $$k_d = C \tag{33}$$

$$k_p = M\Omega^2 - K \tag{34}$$

A model of a permanent magnet DC machine with a rack-and-pinion gearing applies the $F_{e,ref}$ force on the buoy and the electrical output of the machine is $i_{pto}$. See W. W. Weaver et al., "WEC Array Networked Microgrid Control Design and Energy Storage System Requirements", OCEANS' 19 MTS/IEEE, Seattle Wash., Oct. 26-31, 2019; and W. W. Weaver et al., "Super Capacitor Energy Storage System Design for Wave Energy Converter Demonstration", in *IEEE Symposium on Power Electronics, Electrical Drives, Automation and Motion*, IEEE, SPEEDAM, Virtual Meeting, Jun. 24-26, 2020. Each buoy model injects current into a common DC bus with capacitance $C_b$, shunt resistance Rb, and ideal energy storage system ESS. The ESS device is ideal and does not assume any specific storage technologies, such as batteries or super capacitors, in order to study the baseline requirements of the system. The ideal ESS injects the required current to keep the bus voltage $v_b$ at a nominal 330 Vdc. A 1 km under-sea cable that links the array to the shore is modeled as a series RL element and the shore side grid inverter is modeled as a RC circuit and a current source $i_{grid}$, which emulates the power injected to the grid. See W. W. Weaver et al., "WEC Array Networked Microgrid Control Design and Energy Storage System Requirements", OCEANS' 19 MTS/IEEE, Seattle Wash., Oct. 26-31, 2019; and W. W. Weaver et al., "Super Capacitor Energy Storage System Design for Wave Energy Converter Demonstration", in IEEE *Symposium on Power Electronics, Electrical Drives, Automation and Motion*, IEEE, SPEEDAM, Virtual Meeting, Jun. 24-26, 2020.

Figure 15:
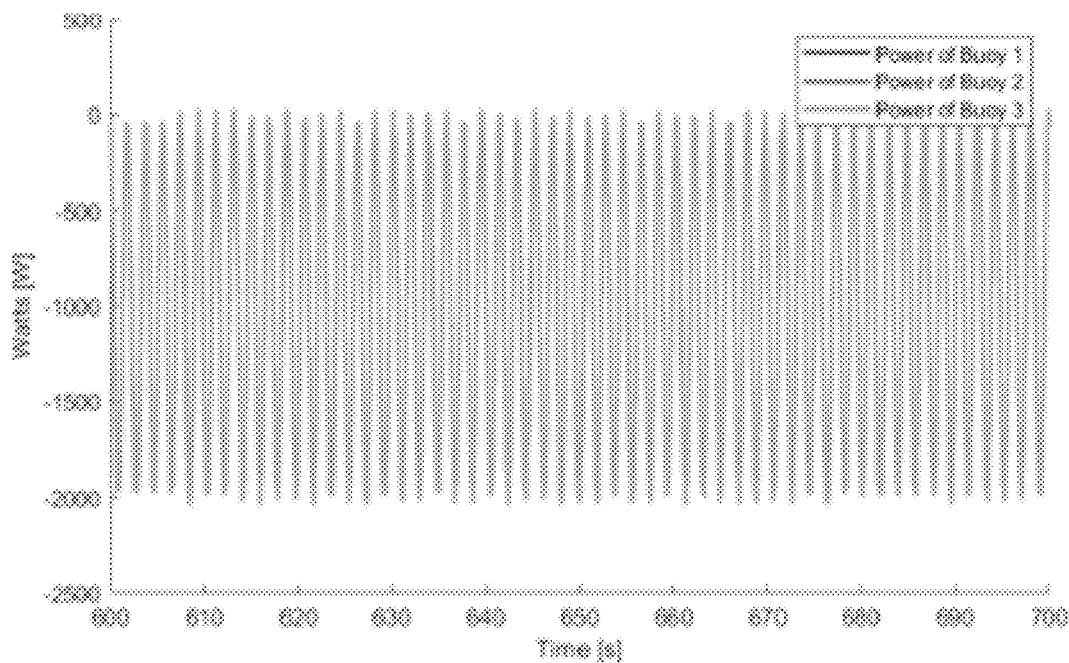
FIG. 15 is a graph of buoy powers at 0 degrees of phase.
Figure 16:
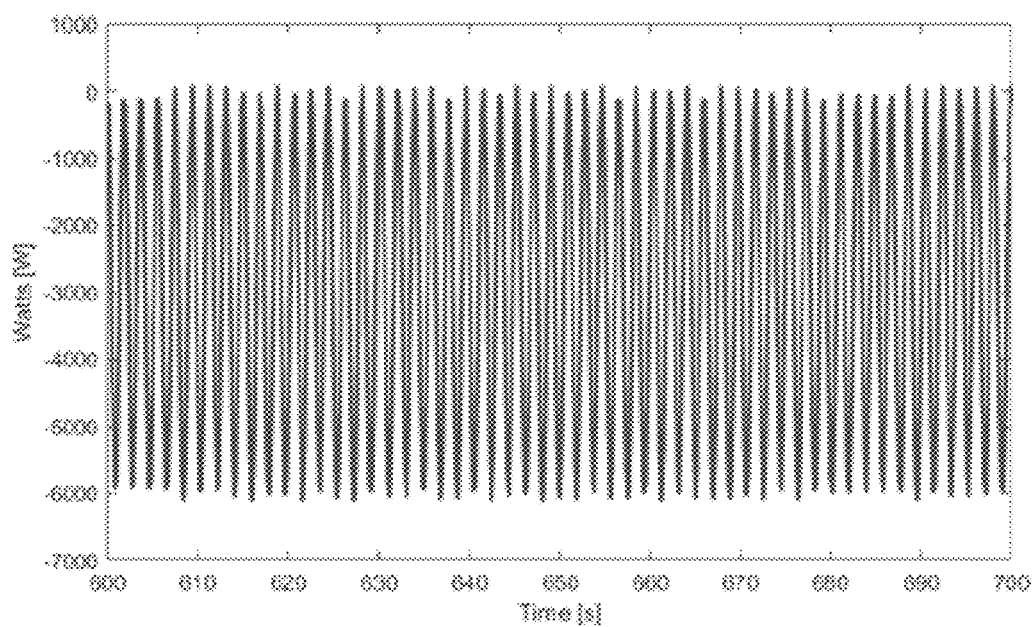
FIG. 16 is a graph of total grid power output at 0 degrees of phase.
Figure 17:
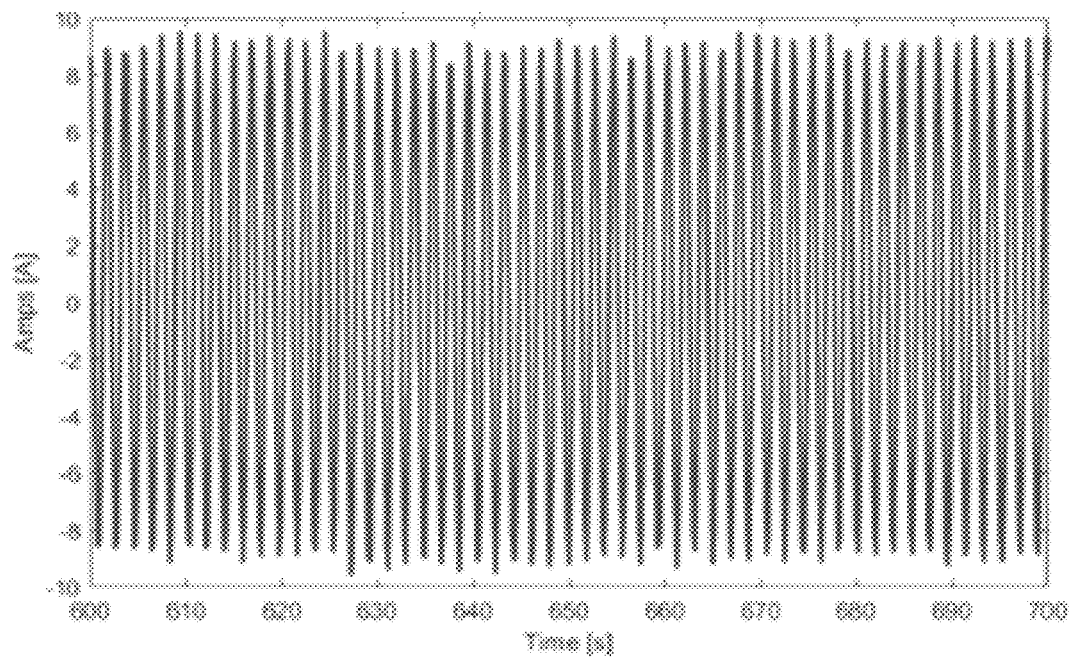
FIG. 17 is a graph of ESS current $i_{ESS}$ for 0 degrees of phase.
Figure 18:
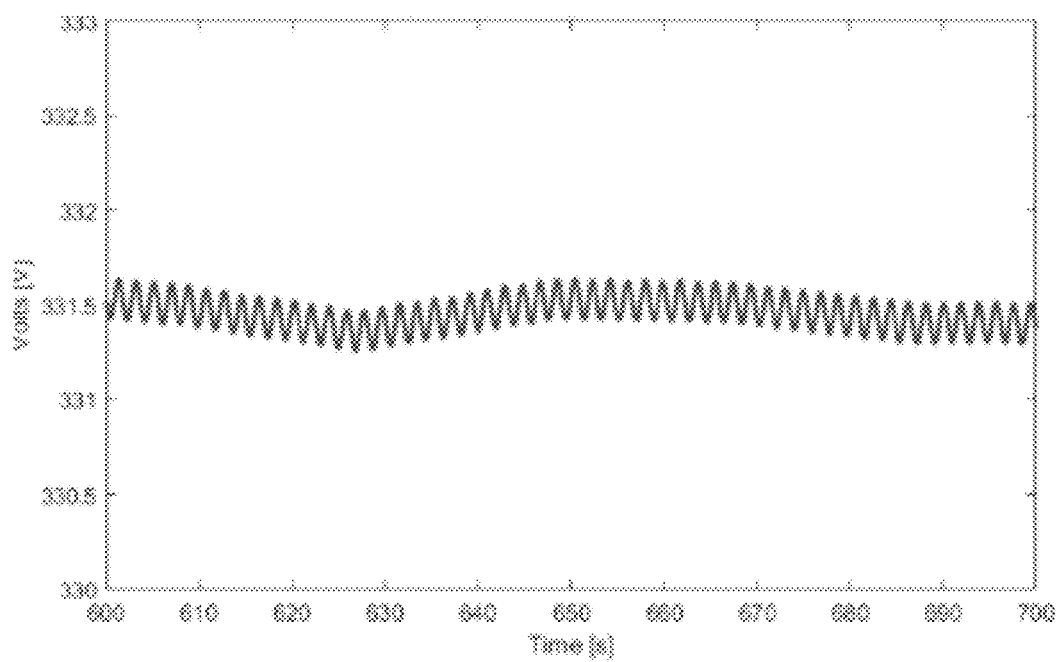
FIG. 18 is a graph of bus voltage $v_b$ for 0 degrees of phase.

To demonstrate the PPN implementation for this WEC array a regular sinusoidal wave force, $F_w$, with a period of 3.77 s was applied to all three buoys, but with different phase values between the waves to model different buoy configurations. For example, when zero phase between the waves is applied, the resulting buoy powers are given in FIG. 15 and the total power to the grid is given in FIG. 16. The current from the ESS and bus voltage for this zero-phase example are shown in FIGS. 17 and 18, respectively.

Figure 19:
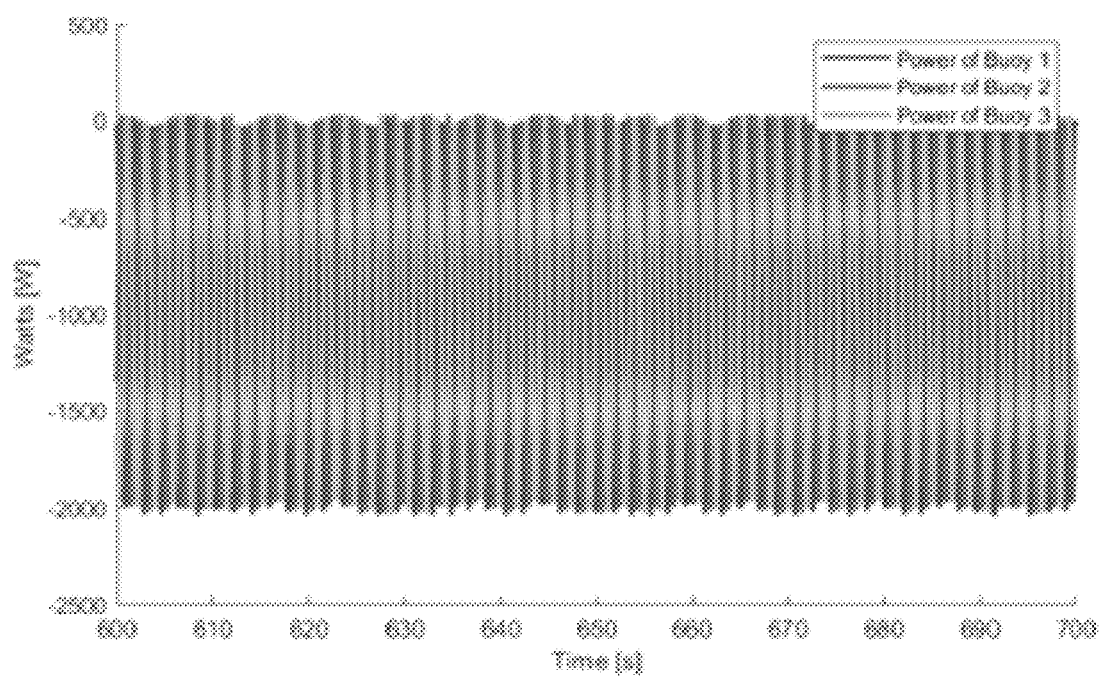
FIG. 19 is a graph of buoy powers at 60 degrees of phase.
Figure 20:
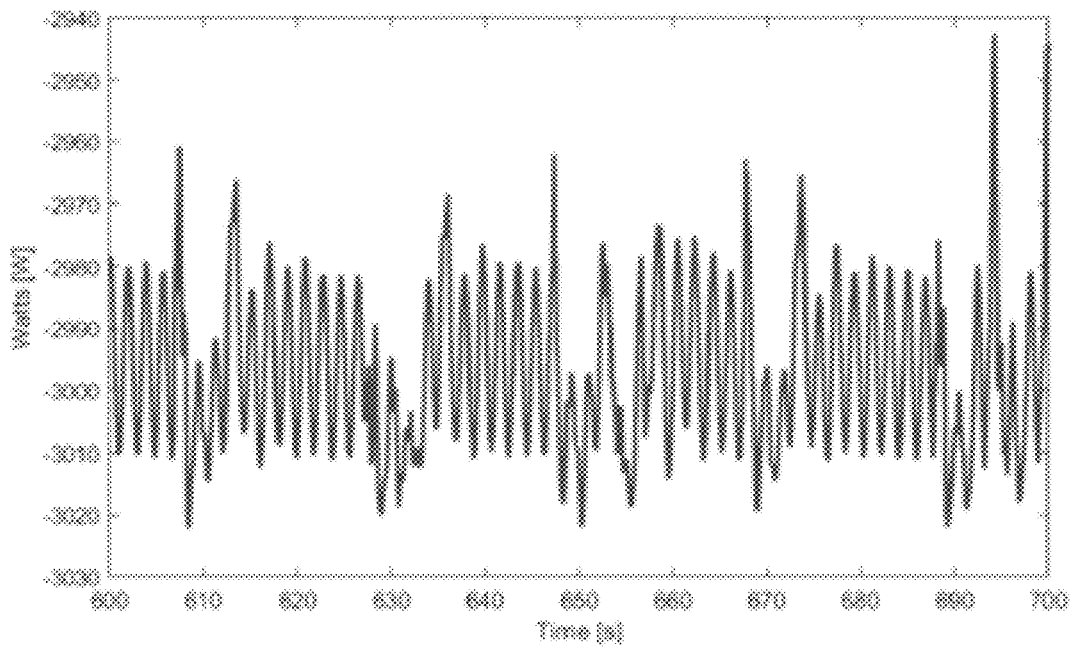
FIG. 20 is a graph of total grid power output at 60 degrees of phase.
Figure 21:
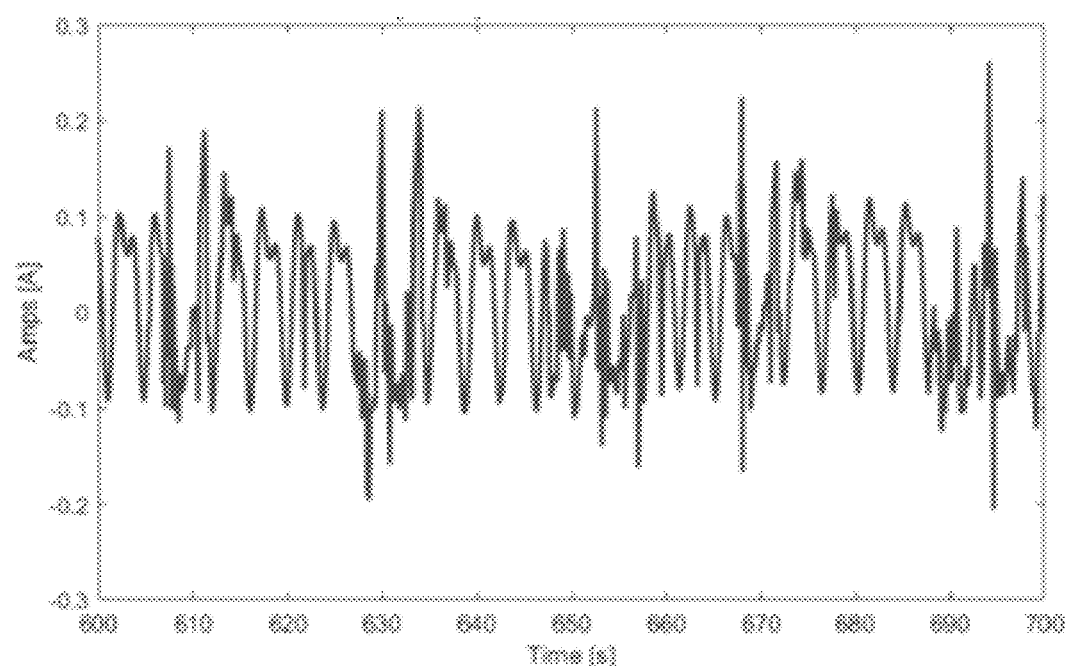
FIG. 21 is a graph of ESS current $i_{ESS}$ for 60 degrees of phase.
Figure 22:
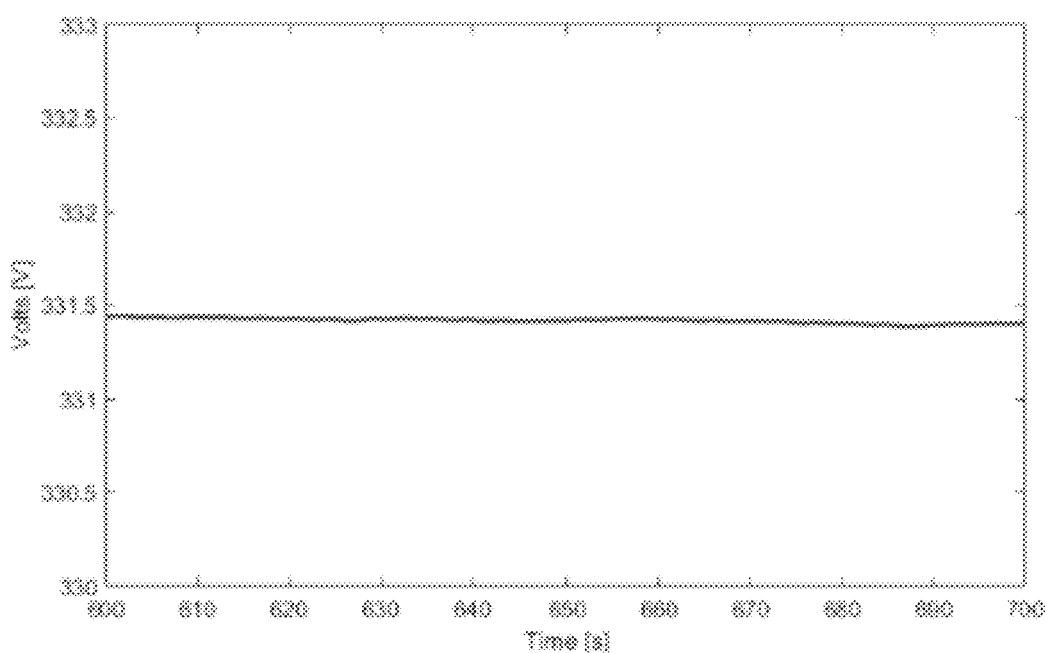
FIG. 22 is a graph of bus voltage $v_b$ for 60 degrees of phase.

When physically spacing the WECs that gives 60° of wave separation between each converter (phase of $F_{\omega,k}$={0, 60, 120} degrees) the resulting buoy powers are shown in FIG. 19. In this example, the powers from the buoys are separated in time and sum up to an almost constant value, much like a traditional 3-phase AC power system. This effect can be seen in the almost constant total grid power shown in FIG. 20 which also lessens the required current from the ESS shown in FIG. 21. The corresponding bus voltage response is shown in FIG. 22. It is important to note that the addition of balanced sinusoidal powers, which happen at 2× the drive frequency, will sum to a constant when the 3 phases are at 60 and 120 degrees out of phase.

Table I summarizes the ESS peak power, ESS energy and average grid power for different value of the wave force phasing. The ESS peak power and storage capability can serve as specifications in the selection of actual storage technologies, such as batteries, flywheels, or super capacitors. See W. W. Weaver et al., "Super Capacitor Energy Storage System Design for Wave Energy Converter Demonstration", in IEEE Symposium on Power Electronics, Electrical Drives, Automation and Motion, IEEE, SPEEDAM, Virtual Meeting, June 24-26, 2020.

Table I shows that both the ESS peak-power and required stored energy are minimized at phase angles of 60 and 120 degrees. Further, it is identified in Table I that the power to the grid slightly increases at 60 and 120 degrees. This grid power increase is due to less parasitic losses in the undersea cable as a result of less variations in the cable current. This effect is similar to an impedance matching network where power can be maximized. Further, this example shows that a WEC array can be positioned as a PPN where the optimum phasing across multiple sources into a network can maximize power as well as minimize energy storage requirements.

TABLE I

PHASING ESS: POWER, ENERGY, AND GRID POWER.

| Phase ° | Power kW | Energy MJ | Grid power kW |
|---|---|---|---|
| 0 | 3.15 | 2.369 | 2.609 |
| 30 | 2.065 | 1.502 | 2.582 |
| 60 | 0.0633 | 0.2264 | 2.592 |
| 90 | 1.035 | 0.8594 | 2.590 |
| 120 | 0.1055 | 0.3405 | 2.594 |

The present invention has been described as a power packet networks for wave energy converter arrays. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A power packet network for wave energy converter arrays, comprising:
    an array of two or more wave energy converters, wherein each wave energy converter converts incoming water wave motion to electrical power that is injected into a collection bus; and
    an energy storage system that injects or absorbs electrical power into or from the collection bus;
    wherein each of the wave energy converters is physically spaced with respect to each other and the incoming water wave such that the electrical power injected into the collection bus from each of the wave energy converters is phased with respect to each other so that the energy stored by the energy storage system required to maintain a constant bus voltage is minimized.

2. The power packet network of claim 1, wherein each wave energy converter comprises a buoy that converts the incoming water wave motion to a mechanical motion and a power take-off that converts the mechanical motion to an electrical power.

3. The power packet network of claim 1, wherein the array comprises three wave energy converters that are physically spaced with respected to each other and the incoming water wave such that the electrical power injected into the collection bus from each of the wave energy converters is phased by 60° with respect to each other.

\* \* \* \* \*